J. M. Watson,
Boot & Shoe Shank.
No. 111,022. Patented Jan. 19, 1871.

Witnesses.

Jeremiah M. Watson
by his attorney

United States Patent Office.

JEREMIAH M. WATSON, OF SHARON, MASSACHUSETTS.

Letters Patent No. 111,022, dated January 17, 1871.

IMPROVEMENT IN SHANK-PIECES FOR BOOTS AND SHOES.

The Schedule referred to in these Letters Patent and making part of the same.

*To all persons to whom these presents may come:*

Be it known that I, JEREMIAH M. WATSON, of Sharon, in the county of Norfolk and State of Massachusetts, have invented an Improved Manufacture of Shank-Pieces for Boots or Shoes; and do hereby declare the same to be fully described in the following specification and represented in the accompanying drawing, of which—

Figure 1:
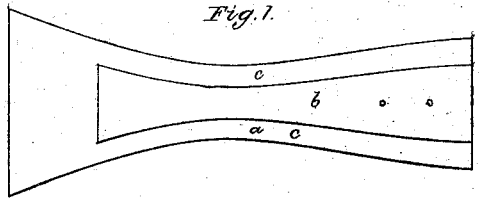
Figure 2:
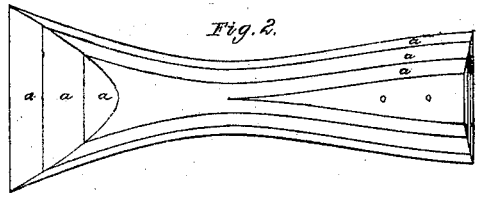
Figure 3:
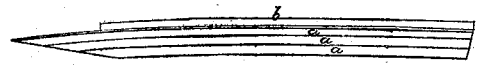
Figure 4:
Figure 5:
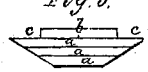
Figure 6:

Figure 1 is a top view;
Figure 2, a bottom view;
Figure 3, a side elevation;
Figure 4, a longitudinal section;
Figure 5, a rear end view; and
Figure 6, a transverse section of it; the plane of this latter section being at the middle of the said shank-piece.

The body-part of the shank-piece is composed of a series of wooden strata or leaves, *a a a*, fastened together at or near their rear ends, and arranged relatively to each other and formed in manner as represented in the drawing, they being separate all along from their point or points of connection to their front ends.

On the upper stratum or elastic piece of the series *a a a* there is arranged an auxiliary piece or leaf, *b*, which, at or near its rear end, is fixed to the series *a a a*, there being a space, *c*, between each of its opposite edges and the next contiguous edge of the leaf *a* on which it is superimposed.

The purposes of the auxiliary leaf *b* are to fill the space between the laps of the vamp on the inside of the shoe, and also to centralize the combined leaves *a a a* relatively to the vamp, and co-operate with the said leaves and form therewith an elastic wooden shank-piece.

Were the auxiliary or vamp-space filling-leaf in one piece with the upper or next contiguous leaf *a*, or fastened thereto firmly throughout the length of the auxiliary leaf, instead of being connected thereto only at or near the heels or rear parts of the two, it would render the compound leaves too stiff or unyielding, and prevent them from any independent play or movement relatively to one another.

In order to insure the best results, it is important that the main shank-piece be composed of a series of leaves or strata arranged as described and connected at or near their rear ends together and to the auxiliary shank-piece at or near its rear end, and that the auxiliary shank or vamp-filling piece should be separate in other respects from that next contiguous to it, the whole being formed of wood in order to insure the necessary elasticity, lightness, and ability of being readily reduced or finished to the desirable shape, as circumstances may require.

I am aware that it is not new to make a shoe shank-piece or stiffener of several layers or pieces of wood or steel, &c., as metallic plates confined together at or near one end of each and molded to the necessary form; therefore I make no claim to such, in the abstract.

I am also aware that it is not new to put leather or other substance in that space, on an insole, which usually exists between the laps of the upper; consequently I make no claim thereto.

What I claim as a new manufacture, and of my invention, is—

The elastic wooden shank-piece, as composed, of the centralizer and vamp-space filling-piece *b*, and the series of body-leaves *a*, all arranged as set forth, and fastened together at or near their rear ends, only as described.

JEREMIAH M. WATSON.

Witnesses:
R. H. EDDY,
S. N. PIPER.